United States Patent Office 2,733,277
Patented Jan. 31, 1956

2,733,277

OLEFIN HALOCARBONS CONTAINING THREE AND FOUR CARBON ATOMS AND METHOD OF MAKING THEM

William T. Miller, Ithaca, N. Y.

No Drawing. Application December 24, 1953, Serial No. 400,381

10 Claims. (Cl. 260—653)

This invention relates to perhalogenated olefinic organic compounds consisting of carbon and halogen and the method of making such compounds. In one aspect this invention relates to a process for the production of perhalogenated acyclic olefinic compounds. This application is a continuation-in-part of my prior and copending application Serial No. 195,135, filed November 10, 1950, now abandoned.

Perhalogenated olefinic organic compounds are desirable because they may be polymerized to higher molecular weight compounds in the nature of oils or solid plastics. Furthermore, these compounds may be used directly as lubricants, refrigerants or as intermediates for the production of acids and other oxygenated halogenated organic compounds.

It is an object of this invention to provide new and useful perhalogenated organic compounds.

It is another object of this invention to provide perhalogenated monomers for subsequent polymerization to higher molecular weight perhalogenated polymers.

Still a further object of this invention is to provide a direct process for the production of perhalogenated olefinic compounds.

Still another object of this invention is to provide new and useful acyclic perhalopropenes containing fluorine.

Various other objects and advantages will become apparent to those skilled in the art from the accompanying description and disclosure.

According to this invention, a perhalogenated acyclic olefinic compound having at least three carbon atoms per molecule is produced by heating a perhalogenated olefinic compound of the formula $CX_2 = CX_2$ in which X is a halogen and in which at least two of the halogens are fluorine at a temperature between about 501° C. and about 900° C., preferably 550° C. to 750° C., for a contact time less than one minute, preferably less than about 30 seconds, and as short as 0.5 second. The starting olefinic compound is a perhalogenated ethylene containing at least two fluorine atoms. Such compounds are trifluorochloroethylene, 1,1-difluorodichloroethylene and tetrafluoroethylene. The products of such reaction comprise perhalogenated polyfluorinated organic compounds having more carbon atoms than the original starting compound. The above method is particularly useful in the production of perfluoro and perfluorochloro acyclic mono-olefins, such as acyclic perhalogenated propenes and butenes containing fluorine. These compounds thus produced are useful as lubricants and intermediates for further synthesis of halogenated materials. The propenes are particularly useful for polymerizing to higher molecular weight liquids and solids which are useful as lubricants and plastics because of their inertness. The propenes produced by the present invention may also be copolymerized with various halogenated organic compounds, such as trifluorochloroethylene and tetrafluoroethylene, to produce polymers in the nature of both oils and solids, having lubricating properties in the case of the oils and plastic properties in the case of the solids.

Preferably the reaction is carried out at a temperature between about 600° C. and about 700° C. for a contact time not substantially greater than 20 seconds, preferably about 10 seconds, ±5 seconds. Short contact time is essential in the production of the acyclic olefinic compounds in order to prevent cracking of the products thus formed at the high temperatures used in the process of this invention. High temperatures are necessary to produce the acyclic compound rather than only the alicyclic compound. Atmospheric or superatmospheric pressures may be employed. The present invention is especially suitable for atmospheric or moderate superatmospheric pressures not higher than about 10 atmospheres.

In order to adequately control the temperature and contact time, the starting material is passed through an elongated reaction tube at a sufficient velocity to obtain the contact time within the required limits and externally heating the tube by conventional means. The product is withdrawn and condensed at temperatures below atmospheric to insure recovery of the low boiling constituents. The components of the crude reaction mixture are suitably recovered in substantially pure form by distillation. The reaction is preferably carried out in the absence of catalysts or promoters, as such catalysts and promoters tend to cause cyclization and cracking of the products. The reaction tube may be made of various conventional materials, such as nickel or pyrex, which will suitably resist the temperatures used during the reaction.

One of the advantages of the method of the present invention is that the process may be carried out in the absence of a catalyst thereby eliminating problems ordinarily encountered in catalytically effected processes.

The products produced by the present invention in substantially high yields, usually above 10 to 20 per cent, are the perfluorochloro propenes and perfluoro and perfluorochloro butenes. Examples of the propenes are 3-chloropentafluoropropene-1 ($CF_2=CFCF_2Cl$) having a boiling point of 7–9° C. at atmospheric pressure, a freezing point of —139.8° C. and a density of 0° C. of 1.5152, 3,3-dichlorotetrafluoropropene-1 ($CF_2=CFCFCl_2$) having a boiling point of about 47° C. at atmospheric pressure and the corresponding isomers of this compound, $CF_2=CClCClF_2$, having a boiling point of about 45° C. at atmospheric pressure, a freezing point of —123.4° C., a density at 20° C. of 1.5407 and an index of refraction at 20° C. of 1.3484 and $CFCl=CFCClF_2$ having a boiling point of 47.5° C. at atmospheric pressure, a freezing point of about —160° C., a density at 20° C. of 1.5335 and an index of refraction of 1.3529 at 20° C. Valuable butenes produced by the present invention are 3,4-dichlorohexafluorobutene-1 ($CF_2=CFCFClCF_2Cl$) having a boiling point of about 64.5 to 65.0° C. at 740 millimeters of mercury or about 64.6 to 65.9° C. at atmospheric pressure, a melting point lower than —80° C., a density of 1.574 at 20° C. and an index of refraction of 1.3412 at 20° C., and octafluorobutene-1 ($CF_3CF_2CF=CF_2$) having a boiling point of about 8 to 10° C. at atmospheric pressure.

The following examples are offered as a better understanding of the present invention, and the process and conditions illustrated by the examples are not to be construed as unnecessarily limiting to the invention.

EXAMPLE 1

In this example the reaction zone was a 15 mm. diameter Pyrex tube of about 13 inches in length. A 5 mm. diameter Pyrex tube was passed through the longitudinal axis of the 15 mm. tube and served as a thermocouple housing. No packing or catalyst of any kind was used in the reaction tube. An oven of about 12 inches long surrounding the tube served to hold the tube to the desired maximum reaction temperature of about 690° C. In starting the process nitrogen gas (dry) was passed through the reaction tube to sweep out air. Thereafter, trifluorochloroethylene was passed through the tube heated to the appropriate temperature at about 20 grams per hour. The effluent from the reaction tube was passed through an atmospheric temperature trap and the uncondensed gases from this trap were passed through a second trap maintained at dry ice temperature. The run was carried out for about 25 hours and the contact time per pass was about 13 seconds.

Table I below shows the approximate temperature at stated distances from the outlet end of the reaction tube:

*Table I*

| Distance from outlet end, inches: | Temperature, ° C. |
|---|---|
| 0 | 310 |
| 1 | 450 |
| 2 | 570 |
| 3 | 630 |
| 4 | 655 |
| 5 | 675 |
| 6 | 680 |
| 7 | 685 |
| 8 | 688 |
| 9 | 680 |
| 10 | 650 |
| 11 | 585 |
| 12 | 450 |
| 13 | 270 |

The products collected in the Dry Ice trap were distilled into the following fractions as shown in Table II:

*Table II*

| Fractions, ° C.: | Quantity of product in grams |
|---|---|
| (1) −22 to −15 | 42.3 |
| (2) −15+2 | 7.9 |
| (3) 8 to 10 | 81.3 |
| (4) 12 to 14 | 17.2 |
| (5) 16 to 17 | 15.0 |
| (6) 20 to 25 | 11.0 |
| (7) Residue | 104.5 |
| Total | 279.2 |

The residue of the above distillation was mixed with the condensate collected from the room temperature trap and distilled in the 50 centimeter column as follows:

*Table III*

| Fractions, ° C.: | Quantity of product in grams |
|---|---|
| (1) Dry Ice temperature | 32.5 |
| (2) 21 to 23 | 6.3 |
| (3) 33 to 35 | 9.7 |
| (4) 45 to 48 | 105.0 |
| (5) 55 to 68 | 52.2 |
| (6) 68 to 90 | 44.8 |
| (7) 90 to 120 | 23.6 |
| (8) Residue | 12.0 |
| Total | 291.1 |

Fraction 3 of Table I was identified as 3-chloropentafluoropropene-1. Fraction 4 of Table III constituted a mixture of the isomers, $CF_2ClCCl=CF_2$ and $CF_2ClCF=CFCl$ and $CF_2CF—CFCl_2$. Fraction 5 was identified as 3, 4-dichlorohexafluorobutene-1.

EXAMPLE 2

A similar run was made under substantially the same conditions as Example 1 except that the temperature was maintained at about 560° C. with the production and recovery of dichlorotetrafluoropropenes and dichlorohexafluorobutene in substantial amounts.

EXAMPLE 3

On continuously passing trifluorochloroethylene through a reaction tube at about 580° C. with a contact time of about 2 seconds there were obtained, in addition to a substantial yield of 1, 2-dichlorohexafluorocyclobutane appreciable yields of $CF_2=CFCF_2Cl$ (3-chloropentafluoropropene-1), $C_4F_6Cl_2$ as $CF_2=CFCFClCF_2Cl$ (3, 4-dichlorohexafluorobutene-1) and $CF_2=CFCFCl_2$ (3, 3 - dichlorotetrafluoropropene - 1) and isomers, $CF_2ClCCl=CF_2$ and $CF_2ClCF=CFCl$, designated by the general formula $C_3F_4Cl_2$.

EXAMPLE 4

On continuously passing tetrafluoroethylene through a reaction tube at a contact time of about 10 seconds at a temperature between 746° C. and 770° C., there was obtained an appreciable yield of $CF_3—CF_2—CF_2=CF_2$ (octafluorobutene-1) ($C_4F_8$).

Thermal reactions of tetrafluoroethylene were carried out in a nickel reactor tube and it was determined that there is no appreciable thermal reaction below 400° C. Cyclic dimerization is the principal type of reaction between 400° C. and 600° C., and above 650° C. perfluorocyclobutane breaks down to perfluoropropene and perfluorobutene-1, and these in turn are cracked above 750° C. to give a mixture of fluorocarbons.

EXAMPLE 5

Using a Pyrex reactor tube one inch in diameter heated over a one foot section to a maximum temperature of 550° C. to 560° C., trifluorochloroethylene passing through this reactor at the rate of 30–40 grams per hour reacts to give the following approximate amounts of principal products:

| | Percent |
|---|---|
| $CFCl_2CF=CF_2$ | 15-25⎫ 30 |
| $CF_2ClCF=CF_2$ | 5-10⎭ |
| $CF_2ClCFClCF=CF_2$ | 35⎫ 65 |
| $CF_2CFClCFClF_2$ | 30⎭ |
| High boiling residues | 5 |

In other similar experiments the ratio of propenes obtained was approximately one to one.

For example, trifluorochloroethylene passed at a 45 g./hr. rate through each of six 3 x 30 cm. Pyrex glass reactor tubes of a small scale pilot plant reacted when heated to 550–560° C. for 15 seconds to give the following approximate yields of major products.

| | Percent |
|---|---|
| $CF_2=CFCF_2Cl$ | 10⎫ 20 |
| $CF_2=CFCFCl_2$ | 10⎭ |
| $CF_2CFClCFClF_2$ | 34 |
| $CF_2=CFCFClCF_2Cl$ | 30 |
| Higher B. P. residue | 5 |
| Lower B. P. by-products | 11 |

These average results were obtained from a total pass of about 20 kilograms of $CF_2=CFCl$ in three units with an average conversion of about 70%.

In addition to the products indicated above, $CF_2ClCFCl_2$,

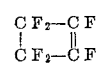

$CF_2=CFCF=CF_2$ have been isolated from the hot tube products of $CF_2=CFCl$. For example, at 650° C. with a contact time of 0.5 second and using a nickel tube, the following products were isolated from a $CF_2=CFCl$ reaction in which 17% of the $CF_2=CFCl$ passed was reacted

| | Per cent |
|---|---|
| $CF_2ClCFCl_2$ | 3 |
| $CF_2=CFCF_2Cl$ | 7 |
| $CF_2=CFCFCl_2$ | 6 |
| $\begin{array}{c}CF_2CF\\ \|\ \ \|\!\|\\ CF_2CF\end{array}$ | 23 |
| $\begin{array}{c}CF_2CFCl\\ \|\ \ \|\!\|\\ CF_2CFCl\end{array}$ | 38 |
| $CF_2=CFCF=CF_2$ | 1.3 |
| $CF_2=CFCFClCF_2Cl$ | 1.9 |
| Residue | 5 |
| Recovery | 85.2 |

Other olefins to which the method of the present invention is applicable are, for example, the dichlorodifluoroethylenes, such as 1,1-dichlorodifluoroethylene.

Recently the need has developed in processes in which highly corrosive reagents are used, for highly stable compounds of a variety of physical properties for various applications in such processes. The unsaturated compounds consisting of carbon and halogen which may be made as described herein are useful, for example, as intermediates for the preparation of high molecular weight polymers, such as oils and solid polymers substantially consisting of carbon and halogen, which have other applications in such processes, such as lubricants. The uses of the compounds of this invention are more fully described in my prior and copending applications Serial Nos. 173,689, filed July 13, 1950, now Patent No. 2,668,182, 211,790, filed February 19, 1951, 182,423, filed August 30, 1950, now Patent No. 2,671,799, and 198,498, filed November 30, 1950, now Patent No. 2,691,036.

Since many embodiments might be made of the present invention and since many changes might be made in the embodiment described, it is to be understood that the foregoing description is to be interpreted as illustrative and not in a limiting sense.

Having described my invention, I claim:

1. A process for preparing a completely halogenated polyfluoroolefin which comprises heating trifluorochloroethylene at a temperature between about 550° C. and about 700° C. for a contact time of about 10 seconds to produce an acyclic completely halogenated olefinic compound containing fluorine and chlorine and having at least 3 carbon atoms.
2. Chloropentafluoropropene.
3. Dichlorotetrafluoropropene.
4. 3-chloropentafluoropropene-1.
5. 3,3-dichlorotetrafluoropropene-1.
6. 2,2-dichlorotetrafluoropropene-1.
7. 1,2-dichlorotetrafluoropropene-1.
8. 3,4-dichlorohexafluorobutene-1.
9. Dichlorohexafluorobutene.
10. A compound selected from the group consisting of chloropentafluoropropene, dichlorotetrafluoropropene and dichlorohexafluorobutene.

References Cited in the file of this patent

UNITED STATES PATENTS

| Re. 23,425 | Harmon | Oct. 30, 1951 |
| 2,404,374 | Harmon | July 23, 1946 |